US008630163B1

(12) United States Patent
Varghis et al.

(10) Patent No.: US 8,630,163 B1
(45) Date of Patent: Jan. 14, 2014

(54) SERVER DRIVEN ENDPOINT RE-HOMING

(75) Inventors: Ivan T. Varghis, Kerala (IN);
Jayaseelan Arulselvan, Karnataka (IN);
Paul E. Jones, Apex, NC (US); Faisal Siyavudeen, Kerala (IN)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 11/536,329

(22) Filed: Sep. 28, 2006

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/26 (2006.01)

(52) U.S. Cl.
USPC ............ 370/217; 370/216; 370/401; 709/244

(58) Field of Classification Search
USPC .......................................................... 370/216
See application file for complete search history.

(56) References Cited

U.S. PATENT DOCUMENTS

| 6,674,734 B1 * | 1/2004 | Hsu et al. ....................... 370/331 |
| 6,732,177 B1 * | 5/2004 | Roy ............................. 709/227 |
| 6,785,223 B1 * | 8/2004 | Korpi et al. ................... 370/218 |
| 6,947,432 B2 * | 9/2005 | Roy ............................. 370/401 |
| 7,151,756 B1 * | 12/2006 | Park et al. ..................... 370/331 |
| 2003/0123635 A1 * | 7/2003 | Lee ........................... 379/220.01 |
| 2003/0167343 A1 * | 9/2003 | Furuno ........................ 709/244 |
| 2004/0174864 A1 * | 9/2004 | Klaghofer .................... 370/352 |
| 2004/0193951 A1 * | 9/2004 | Shaffer et al. .................... 714/9 |
| 2005/0117597 A1 * | 6/2005 | Jones et al. ................... 370/401 |

FOREIGN PATENT DOCUMENTS

JP       2004-023385      *   1/2004   ............. H04L 12/56

OTHER PUBLICATIONS

"Avaya Application Solutions: IP Telephony Depolyment Guide," Issue 4.3, Feb. 2006, Avaya Inc.*
Avaya, "Avaya Application Solutions: IP Telephony Deployment Guide," Feb. 2006, Avaya.*

* cited by examiner

Primary Examiner — Jae Y Lee
(74) Attorney, Agent, or Firm — P. Su

(57) ABSTRACT

In one embodiment, a method includes receiving an indication of an availability from a primary registration server that is associated an endpoint associated an Internet Protocol (IP) protocol. The method also includes determining whether the primary registration server is available, and notifying the endpoint that the primary registration server is available if the primary registration server is available.

24 Claims, 11 Drawing Sheets

SERVER DRIVEN ENDPOINT RE-HOMING

TECHNICAL FIELD

The present disclosure relates generally to Internet Protocol (IP networks)

BACKGROUND OF THE INVENTION

H.323 is an International Telecommunications Union (ITU) standard that defines protocols to provide audio and visual communication sessions in packet-based networks. H.323 is often used for Voice over Internet Protocol (VoIP). In the H.323 standard, an endpoint may have an assigned gatekeeper. When the assigned gatekeeper for an endpoint is unavailable, the endpoint may register itself with an alternate gatekeeper. The endpoint may then send queries to the assigned gatekeeper until the assigned gatekeeper is detected, e.g., until the assigned gatekeeper becomes available. Such queries utilize resources within a network in proportion to the number of affected devices on the network, leading to performance degradation in larger networks. Once the assigned gatekeeper is detected, the endpoint may then re-register with the assigned gatekeeper.

BRIEF DESCRIPTION OF THE DRAWINGS

The invention may best be understood by reference to the following description taken in conjunction with the accompanying drawings in which.

DESCRIPTION OF EXAMPLE EMBODIMENTS

Within an Internet Protocol (IP) network, an endpoint may have an assigned home registration server and at least one alternate registration servers. If the home registration server is unavailable, the endpoint may register with an alternate registration server. Once the home registration server becomes available, the endpoint may unregister from the alternate registration server and re-home, or otherwise re-register, with the home registration server.

Voice over IP (VoIP) networks may support the H.323 standard specified by the International Telecommunications Union (ITU). In such networks, an endpoint may be assigned to a primary registration server that has associated alternate registration servers. To effectively ensure continuity of service to the endpoint in the event that a primary registration server fails or otherwise becomes unavailable, an alternate registration server may be arranged to provide service to the endpoint. As it is often desirable for an endpoint to be registered with its assigned primary registration server whenever possible, the endpoint may query the assigned primary registration server until the assigned primary registration server is indicated as being available. The querying of a primary registration server by an endpoint typically utilizes a considerable amount of overhead within a network.

By allowing a primary registration server and an associated alternate registration server to communicate to determine when the primary registration server is available, the amount of overhead associated with discovering the status of the primary registration server is reduced. Upon ascertaining that the primary registration server is available, the associated alternate registration server may send a re-homing request, which may include an unregistration request in one embodiment, to any endpoints which are assigned to the primary registration server. The endpoints may register with the primary registration server. Hence, the endpoints effectively re-home to the primary registration server without having to repeatedly query the primary registration server.

Figure 1:
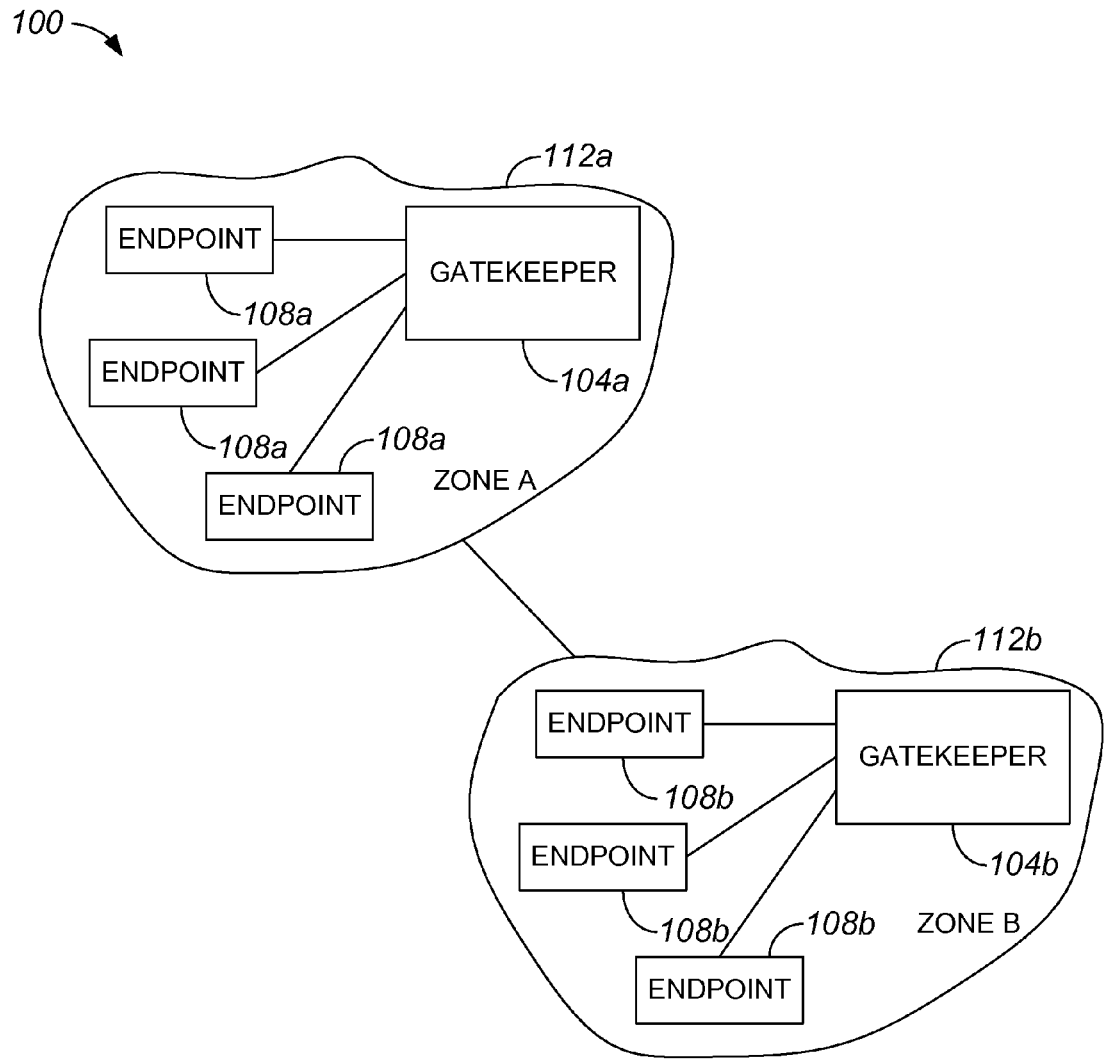
FIG. 1 illustrates an example network with endpoints and gatekeepers associated with zones.

In a network which supports the H.323 standard, registration servers may be gatekeepers. Each gatekeeper is generally associated with a zone. A zone may be defined to be a gatekeeper and endpoints associated with the gatekeeper. With reference to FIG. 1, a network with endpoints and gatekeepers that are associated with zones will be described in accordance with an embodiment of the present invention. A network 100 includes multiple zones 112a, 112b. In the described embodiment, each zone 112a, 112b has an active gatekeeper 104a, 104b, respectively. Endpoints 108a in zone 112a use services provided by gatekeeper 104a, while endpoints 108b in zone 112b use services provided by gatekeeper 104b.

Gatekeepers 104a, 104b provide functionality including, but not limited to, address translation, admission control, bandwidth control, and zone management. Gatekeepers 104a, 104b may also route packets, e.g., packets associated with a call, to appropriate destinations. The address translation functionality of gatekeepers 104a, 104b allow gatekeepers 104a, 104b to translate H.323 identifiers, or alias addresses, and standard telephone numbers into IP addresses for endpoints 108a, 108b. Using Registration, Admission, and Status (RAS) messages, gatekeepers 104a, 104b control admission of endpoints 108a, 108b into network 100 and also manage bandwidth requirements. Zone management functionality typically involves controlling registration processes of endpoints 108a, 108b.

Endpoints 108a, 108b may generally be nodes, e.g., H.323 nodes, such as gateways, terminals including telephones and video conferencing terminals, and multipoint control units. Each endpoint 108a is assigned to zone 112a and, hence, to gatekeeper 104a. Similarly, each endpoint 108b is assigned to zone 112b and, hence, to gatekeeper 104b.

Gatekeeper 104a may have associated alternate gatekeepers (not shown) to which endpoints 108a may be moved in the event that gatekeeper 104a becomes unavailable. In other words, if gatekeeper 104a crashes, or is otherwise unwilling or unable to support endpoints 108a, endpoints 108a may register with an alternate gatekeeper (not shown) that is associated with zone 112a. Gatekeeper 104a may also be rendered as unavailable for other reasons including, but not limited to, a need to perform service or maintenance on gatekeeper 104a and a lack of an available network route between endpoints 108a and gatekeeper 104a. It should be appreciated that the unavailablility of gatekeeper 104a is not limited to the unreachability of gatekeeper. For example, gatekeeper 104a may also be rendered as unavailable because of an overloading of gatekeeper 104a, or an explicit redirection of endpoints 108a to register with an alternate gatekeeper (not shown).

Figure 2A:
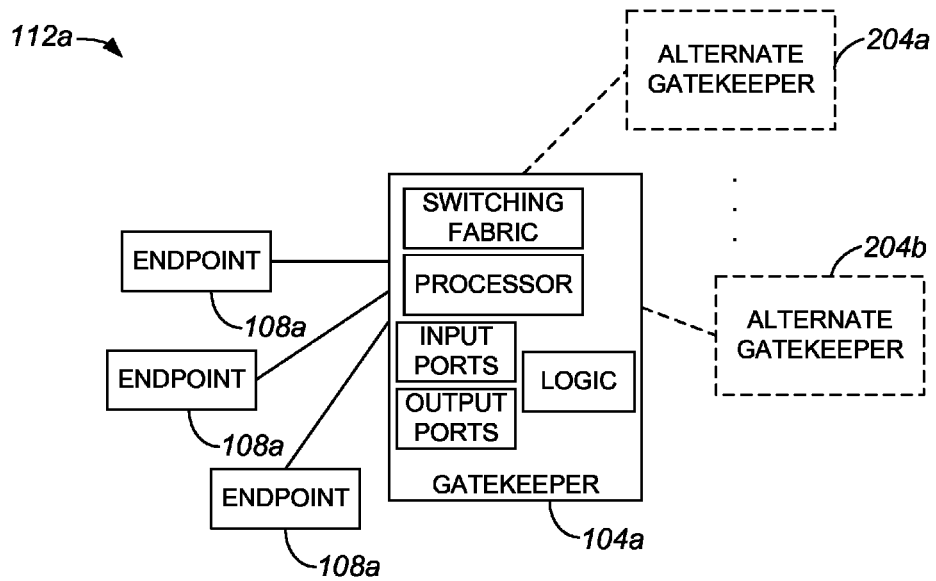
FIG. 2A illustrates an example primary gatekeeper.

FIG. 2A is a block diagram representation of gatekeeper 104a within zone 112a with alternate gatekeepers in accordance with an embodiment of the present invention. Gatekeeper 104a may be a router or a device with routing capabilities. Gatekeeper 104a may also be a embodied as a UNIX machine with gatekeeper software installed thereon, and have no capability for routing packets. In one embodiment, gatekeeper 104 is a Cisco IOS router, available commercially from Cisco Systems, Inc. of San Jose, Calif.

Gatekeeper 104a may include input ports for receiving data, output ports for outputting data, a processor that executes logic, and a switching fabric that substantially interconnects input ports and output ports. The logic executed by the processor may include, but is not limited to, software code devices arranged to determine when gatekeeper 104a is available, software code devices arranged to process requests, and software code devices arranged to service request. In one embodiment, the logic may be embodied in a tangible media such as a memory or a data storage device. Logic may instead include hardware devices. Endpoints 108a are in communication with gatekeeper 104a when gatekeeper 104a is available. As such, gatekeeper 104a provides services to endpoints 108a.

Figure 2B:
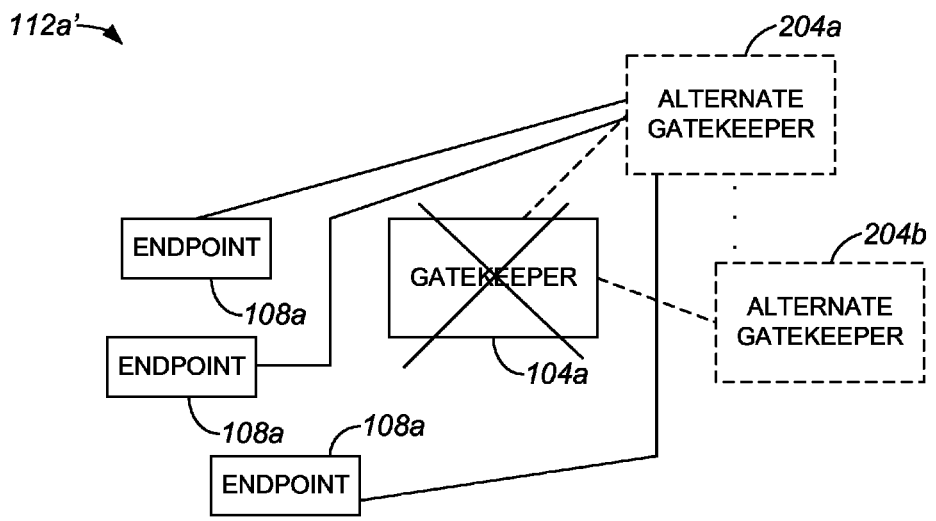
FIG. 2B illustrates example alternate gatekeepers.

Alternate gatekeepers 204a, which may be a part of zone 112a, are arranged to act as alternates to gatekeeper 104a such that when gatekeeper 104a is not available, endpoints 108a may register with at least one alternate gatekeeper 204a. As shown in FIG. 2B, within zone 112a', when gatekeeper 104a is unavailable to endpoints 108a, endpoints 108a may register with alternate gatekeeper 204a such that gatekeeper 204a provides services to endpoints 108a.

Figure 3A:
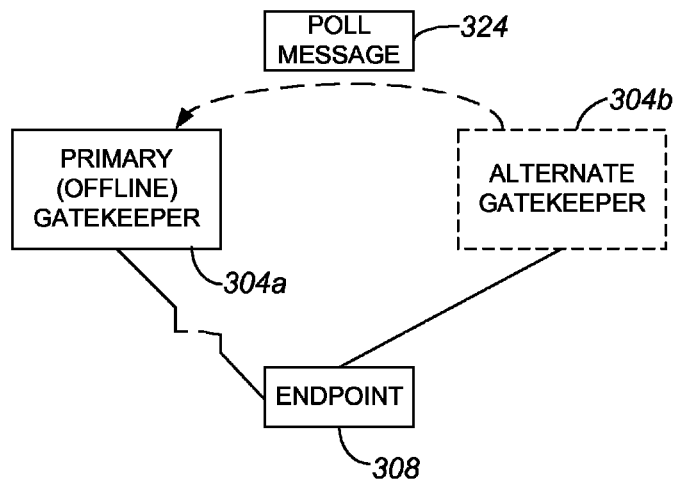
FIG. 3A illustrates an example alternate gatekeeper communicating a poll message to a primary gatekeeper.

In one embodiment, once a primary gatekeeper to which an endpoint is assigned becomes unavailable or is otherwise offline, an associated alternate gatekeeper with which the endpoint is registered may poll the primary gatekeeper to determine when the primary gatekeeper becomes available. FIG. 3A is a block diagram representation of an alternate gatekeeper sending a poll message to a primary gatekeeper in accordance with an embodiment of the present invention. An endpoint 308 which is assigned to a primary gatekeeper 304a is registered to an alternate gatekeeper 304b because primary gatekeeper 304a is unavailable or offline. Alternate gatekeeper 304b obtains information that identifies primary gatekeeper 304a as being assigned to endpoint 308. In one embodiment, when endpoint 308 registers with alternate gatekeeper 304b, endpoint 308 may provide information to alternate gatekeeper 304b that identifies primary gatekeeper 304a as being assigned to endpoint 308. Hence, alternate gatekeeper 304b is aware that endpoint 308 is assigned to primary gatekeeper 304a.

Figure 3B:
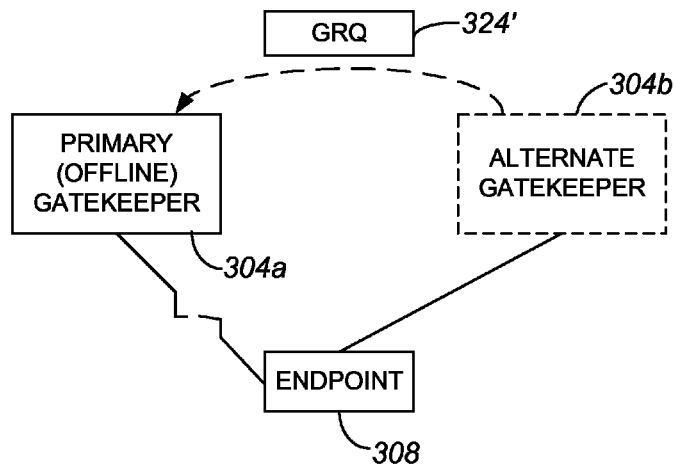
FIG. 3B illustrates an example alternate gatekeeper communicating a gatekeeper request message (GRQ) to a primary gatekeeper.

Alternate gatekeeper 304b sends a poll message 324 to primary gatekeeper 304. Poll message 324 is used to check whether primary gatekeeper 304a is active or otherwise available. The configuration of poll message 324 may vary widely. In one embodiment, when H.323 is supported, poll message 324 may be a gatekeeper discovery request (GRQ) or a similar request. As shown in FIG. 3B, alternate gatekeeper 304b may send a GRQ 324' to primary gatekeeper 304a in an effort to determine whether primary gatekeeper 304a is available. If primary gatekeeper 304a is available, primary gatekeeper 304a may send a gatekeeper confirm (GCF) (not shown) to alternate gatekeeper 304b.

Figure 4:
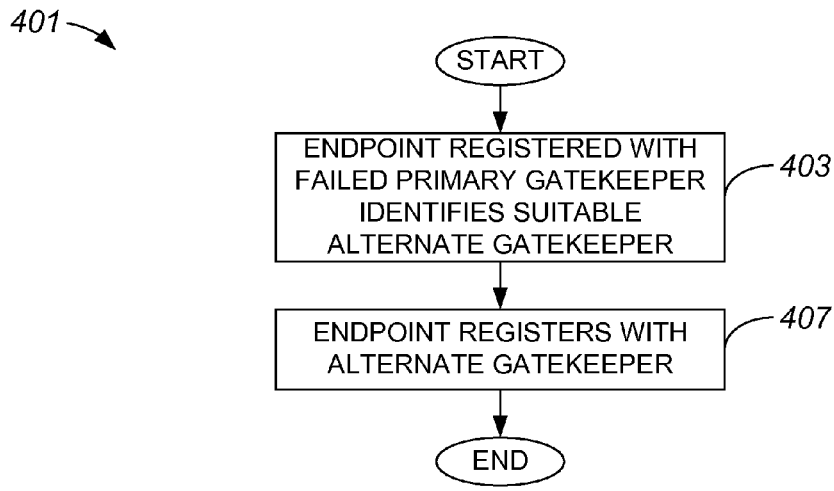
FIG. 4 illustrates an example method for addressing a failure at a primary gatekeeper.

In general, when a primary gatekeeper becomes unavailable, an endpoint that is registered with the primary gatekeeper is essentially notified that the primary gatekeeper has become unavailable, e.g., is either unable or unwilling to support the endpoint. A notification may entail the endpoint noticing that the primary gatekeeper is no longer responsive. Alternatively, a notification may entail a functioning primary gatekeeper sending the endpoint an instruction to move to an alternate gatekeeper. With reference to FIG. 4, one method of addressing the unavailability of a primary gatekeeper will be described in accordance with an embodiment of the present invention. A process 401 of addressing the unavailability of a primary gatekeeper begins at step 403 in which an endpoint that is registered with a failed, or otherwise unavailable, primary gatekeeper identifies a suitable alternate gatekeeper. The endpoint may identify a suitable alternate gatekeeper by examining relevant information stored in the endpoint. The endpoint may be provisioned with alternate gatekeeper information or may be provided with alternate gatekeeper information by any gatekeeper with which it communicates. In general, a list of alternate gatekeepers may be provided to an endpoint. If an endpoint is associated with more than one suitable alternate gatekeeper, a suitable alternate gatekeeper may be identified by the endpoint. Once the endpoint identifies a suitable alternate gatekeeper, the endpoint registers with the identified suitable alternate gatekeeper in step 407. Registering with the identified suitable alternate gatekeeper may include, but is not limited to, the endpoint sending a registration request (RRQ) to the identified suitable alternate gatekeeper. After the endpoint registers with the identified suitable alternate gatekeeper, the process of addressing the unavailability of a primary gatekeeper is completed.

In general, once the primary gatekeeper to which an endpoint is assigned becomes available, the endpoint re-registers with the primary gatekeeper, e.g., re-homes. An alternate gatekeeper with which an endpoint is registered may be physically located far away from a particular zone. As such, if a primary gatekeeper for the zone becomes available, allowing the endpoint to re-register with the primary gatekeeper is more efficient than allowing the endpoint to remain registered with the alternate gatekeeper. Hence, the alternate gatekeeper may either poll the primary gatekeeper to determine when the primary gatekeeper is available, or the primary gatekeeper may inform the alternate gatekeeper when the primary gatekeeper becomes available.

Figure 5A:
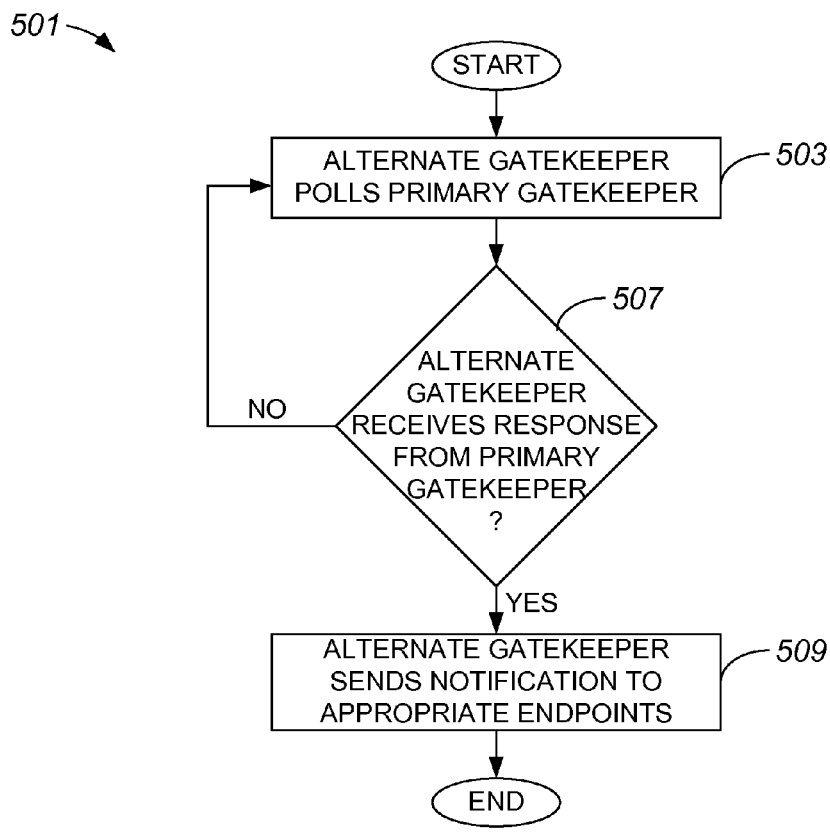
FIG. 5A illustrates an example method for obtaining and processing information regarding the status of a primary gatekeeper.

Referring next to FIG. 5A, a method of obtaining and processing the status of a primary gatekeeper that includes polling the primary gatekeeper will be described in accordance with an embodiment of the present invention. A process 501 of ascertaining the status of a primary gatekeeper begins at step 503 in which an alternate gatekeeper polls an associated primary gatekeeper. In one embodiment, the alternate gatekeeper may send a GRQ to the primary gatekeeper. A determination is made in step 507 regarding whether the alternate gatekeeper receives a response from the primary gatekeeper. By way of example, in response to a GRQ, it may be determined if a GCF is received from the primary gatekeeper.

If it is determined in step 507 that no response is received from the primary gatekeeper, the indication is that the primary gatekeeper is still unavailable. Accordingly, process flow returns to step 503 in which the alternate gatekeeper polls the primary gatekeeper. Alternatively, if it is determined in step 507 that the alternate gatekeeper receives a response such as a GCF from the primary gatekeeper, the implication is that the primary gatekeeper is available. As such, in step 509, the alternate gatekeeper sends a notification to appropriate endpoints, e.g., the endpoints assigned to the primary gatekeeper, to inform the appropriate endpoints of the availability of the primary gatekeeper. The notification may be an admission rejection (ARJ) or a registration rejection (RRJ). It should be appreciated that an ARJ may be sent by the alternate gatekeeper when an endpoint sends an admission request (ARQ), and that a RRJ may be sent by the alternate gatekeeper when an endpoint sends an RRQ. Once the alternate gatekeeper sends notification to the appropriate endpoints, the process of ascertaining the status of a primary gatekeeper is completed.

Figure 5B:
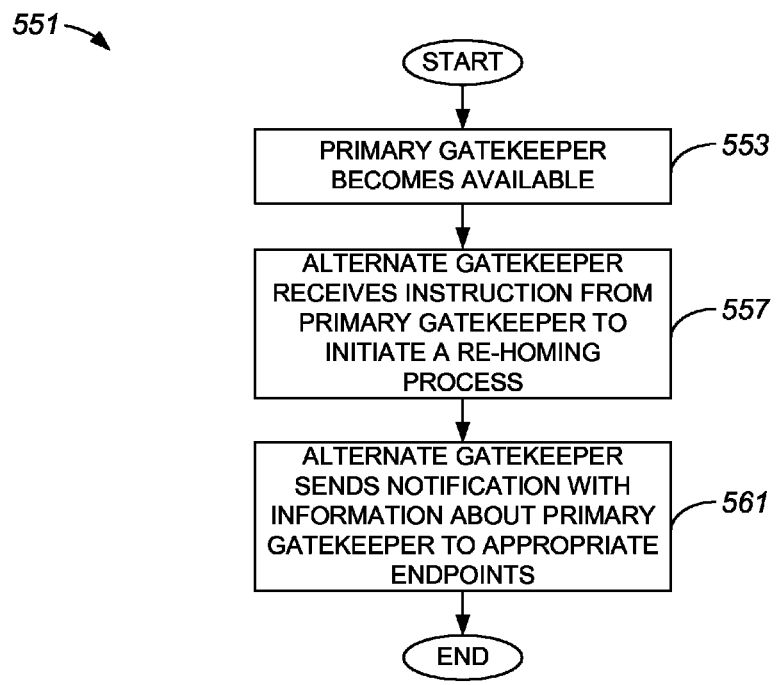
FIG. 5B illustrates another example method for obtaining and processing information regarding the status of a primary gatekeeper.

As previously mentioned, a primary gatekeeper may provide information pertaining to a change in its availability status to an alternate gatekeeper. In one embodiment, substantially all gatekeepers in a system that act as alternates to one another are clustered such that each gatekeeper stores information pertaining to endpoints and the primary gatekeepers assigned to the endpoints. In such a system, when an endpoint registers with an alternate gatekeeper, the alternate gatekeeper identifies the assigned gatekeeper associated with the endpoint. The endpoint may provide an indicator of its assigned gatekeeper to the alternate gatekeeper. When an alternate gatekeeper and an endpoint are a part of the same cluster, information pertaining to the assigned gatekeeper of the endpoint may be exchanged dynamically, may be stored in a shared database, or may be stored in a distributed database. FIG. 5B is a process flow diagram which illustrates one method of obtaining and processing information regarding the status of a primary gatekeeper in a system in which gatekeepers are clustered in accordance with an embodiment of the present invention. A process 551 of ascertaining the status of a primary gatekeeper begins at step 553 in which a previously unavailable primary gatekeeper becomes available. In step 557, an alternate gatekeeper receives an instruction or a request from the primary gatekeeper to initiate a re-homing process. Upon receiving the instruction, the alternate gatekeeper sends a notification to appropriate endpoints in step 561. The appropriate endpoints are generally endpoints that are identified by the alternate gatekeeper as being assigned to the primary gatekeeper. The notification may be, in one embodiment, an unregistration request (URQ) that includes information identifying the primary gatekeeper. The information identifying the primary gatekeeper may be stored in an "alternate gatekeeper" field in the URQ. Once the alternate gatekeeper effectively notifies appropriate endpoints of the availability of the primary gatekeeper, the process of ascertaining the status of the primary gatekeeper is completed.

Figure 6:
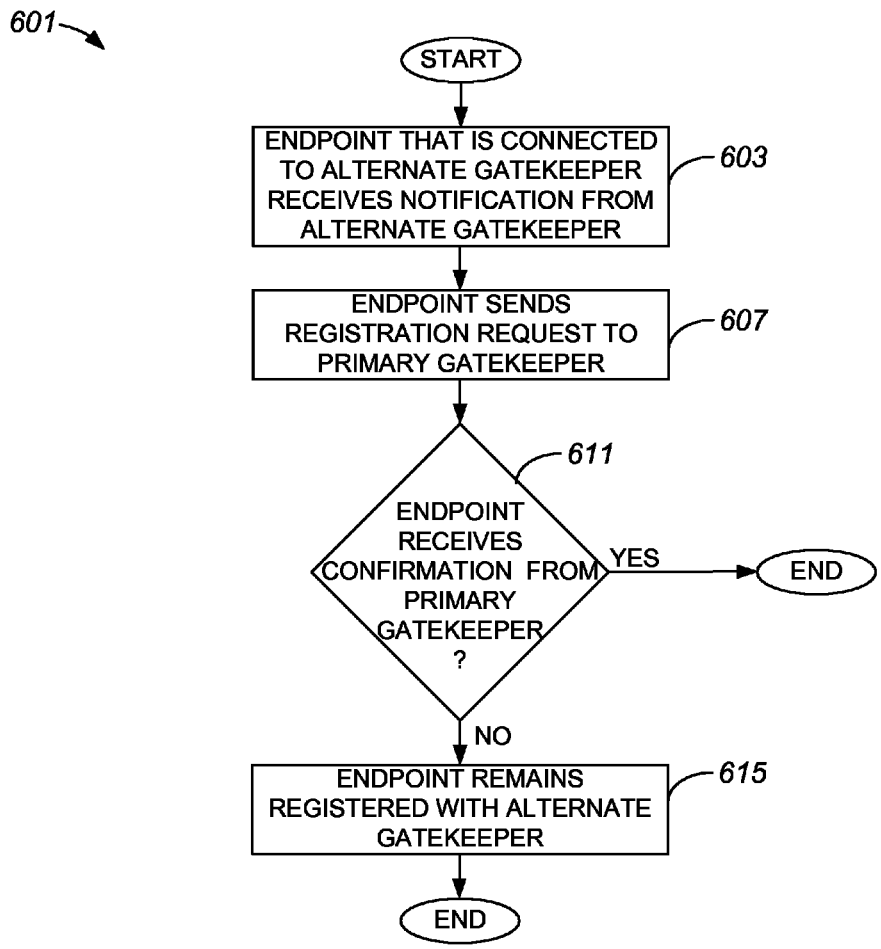
FIG. 6 illustrates an example method for establishing a connection between an endpoint and a primary gatekeeper.

An endpoint re-registers with an assigned primary gatekeeper once the endpoint is effectively notified that the assigned primary gatekeeper is available. It should be appreciated, however, that in some systems, an endpoint may not have to re-register with an associated primary gatekeeper. In general, if a URQ was sent to an endpoint by an alternate gatekeeper, then the endpoint may re-register with an assigned primary gatekeeper. However, if an ARJ was sent by the alternate gatekeeper, the endpoint may not necessarily need to re-register with the primary gatekeeper. FIG. 6 is a process flow diagram which illustrates one method of registering an endpoint with an assigned primary gatekeeper in accordance with an embodiment of the present invention. A process 601 of registering an endpoint with an assigned primary gatekeeper begins at step 603 in which the endpoint receives notification from an alternate gatekeeper, e.g., the alternate gatekeeper with which the endpoint is registered. The notification may be, but is not limited to being, an ARJ sent by the alternate gatekeeper in response to an ARQ sent by the endpoint or a URQ. Both the ARJ and the URQ may contain the address of the assigned primary gatekeeper in step 607, the endpoint sends a registration request to the assigned primary gatekeeper. In other words, the endpoint begins a re-homing process. The registration request may be a RRQ, or may include a GRQ associated with a discovery process.

It is determined in step 611 whether the endpoint receives confirmation from the assigned primary gatekeeper. By way of example, it is determined if the endpoint either receives a GCF in response to a GRQ or a registration confirm (RCF) in response to a RRQ. If the endpoint receives confirmation, the process of registering an endpoint is completed. Alternatively, if it is determined in step 611 that confirmation is not received by the endpoint, the indication may be that the assigned primary gatekeeper is no longer available. Accordingly, process flow moves to step 615 in which the endpoint remains registered with the alternate gatekeeper. After the endpoint registers with the alternate gatekeeper, the process of registering an endpoint is completed.

Figure 7A:
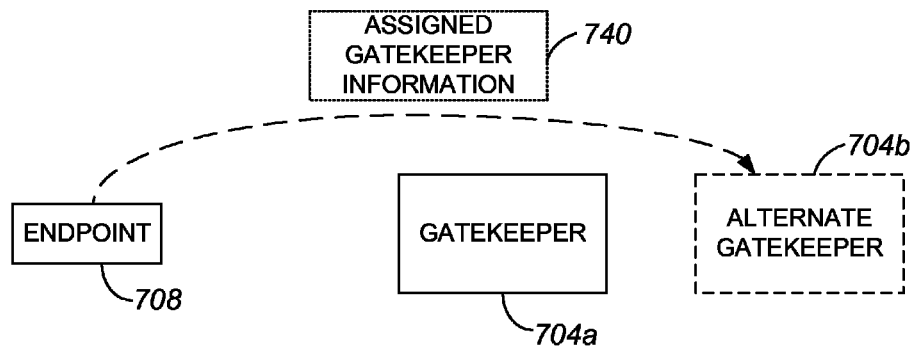
FIG. 7A illustrates an example endpoint communicating to an alternate gatekeeper information that identifies an assigned gatekeeper for the endpoint.

An alternate gatekeeper may obtain information pertaining to a primary gatekeeper with which an endpoint is obtained in a variety of different manners. For example, an endpoint may provide information to an alternate gatekeeper that identifies the primary gatekeeper when the endpoint registers with the alternate gatekeeper. FIG. 7A is a block diagram representation of an endpoint providing an alternate gatekeeper with information that identifies the gatekeeper assigned to the endpoint in accordance with an embodiment of the present invention. An endpoint 708 provides assigned gatekeeper information 740 to an alternate gatekeeper 704b. Assigned gatekeeper information 740 identifies a gatekeeper 704a as being assigned to endpoint 708, e.g., gatekeeper 704a is the primary gatekeeper associated with endpoint 708. Typically, if endpoint 708 supports a re-homing process, endpoint 708 sends assigned gatekeeper information 740 as a part of a message such as a GRQ or RRQ message. Within a GRQ or RRQ message, assigned gatekeeper information 740 may be sent in a field specified as an "assigned gatekeeper" field or as a part of a "support assigned gatekeeper" field.

Figure 7B:
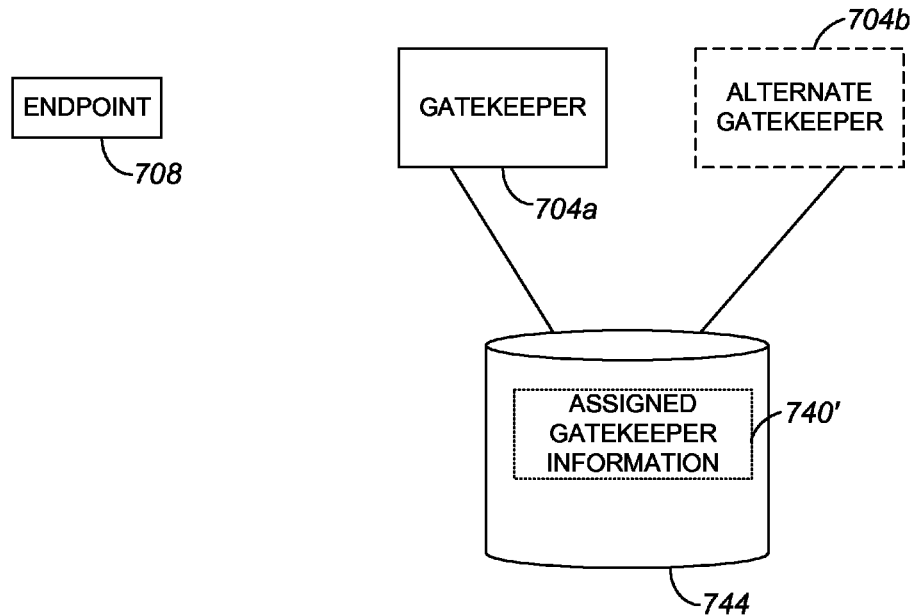
FIG. 7B illustrates an example primary gatekeeper, an example alternate gatekeeper, and example assigned gatekeeper information.

Information that identifies a primary gatekeeper to which an endpoint is assigned may also be obtained by an alternate gatekeeper using a database. As shown in FIG. 7B, gatekeeper 704a and alternate gatekeeper 704b may have access to a database 744 or other structure in which assigned gatekeeper information 740' is stored. Assigned gatekeeper information 740' generally identifies gatekeeper 704a as being a primary gatekeeper to which endpoint 708 is assigned. It should be appreciated that although database 744 may be used to store assigned gatekeeper information 740' in substantially any system, database 744 may often be used to provide assigned gatekeeper information 740' in a system in which endpoint 708 effectively does not support a re-homing process.

A re-homing process may be implemented in networks other than IP networks which support the H.323 standard. For example, a re-homing process may be implemented in a network that supports a Session Initiation Protocol (SIP). SIP is a signaling protocol that is suitable for use in establishing a session, e.g., a call, in an IP network. Within a network that supports SIP, user equipment or endpoints may register with registrars. Registrars, which implement registration functions that are similar to those provided by a gatekeeper in an H.323 network, may be associated with SIP servers. SIP servers may generally include one or more registrars. Alternatively, SIP servers may include one or more proxies, or may include both registrars and proxies. SIP servers may provide address resolution, and route packets, e.g., packets associated with outbound calls, on appropriate paths. When a primary server becomes unavailable to an endpoint, the endpoint may register with an alternate server. Once the primary server becomes available, the endpoint may re-home or re-register to the primary server.

Figure 8:
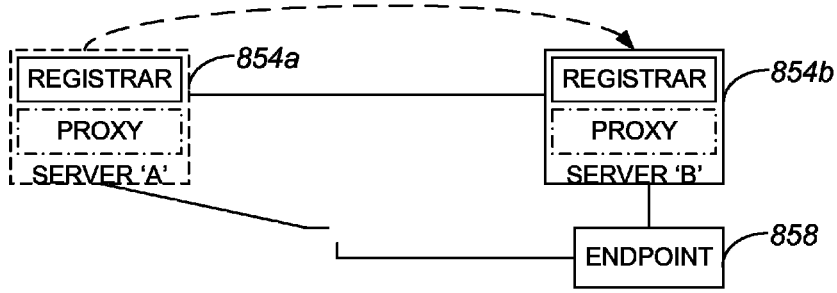
FIG. 8 illustrates an example alternate or peer server with registrar functionality communicating with a primary server with registrar functionality to determine when an endpoint may re-establish communication with the primary proxy server.

In one embodiment, an alternate server and a primary server may interact such that the alternate server may ascertain when the primary server becomes available. Once the alternate server determines that the primary server is available, the alternate server may notify endpoints registered with the alternate server but assigned to the primary server. FIG. 8 is a block diagram of a system in which an alternate server communicates with a primary server to determine when an endpoint may re-home to the primary server in accordance with an embodiment of the present invention. An endpoint 858, which is assigned to a server 'A' 854*a*, is registered with or serviced by a server 'B' 854*b*. In the described embodiment, server 'A' 854*a* is a primary server for endpoint 858, but is unavailable. Hence, endpoint 858 is registered with server 'B' 854*b*, which is an alternate server for endpoint 858.

Server 'A' 854*a* and server 'B' 854*b*, which each include a registrar and which may each optionally include a proxy, may communicate substantially directly with each other. For example, when server 'A' 854*a* becomes available, server 'A' 854*a* may send a message to server 'B' 854*b*.

Figure 9A:
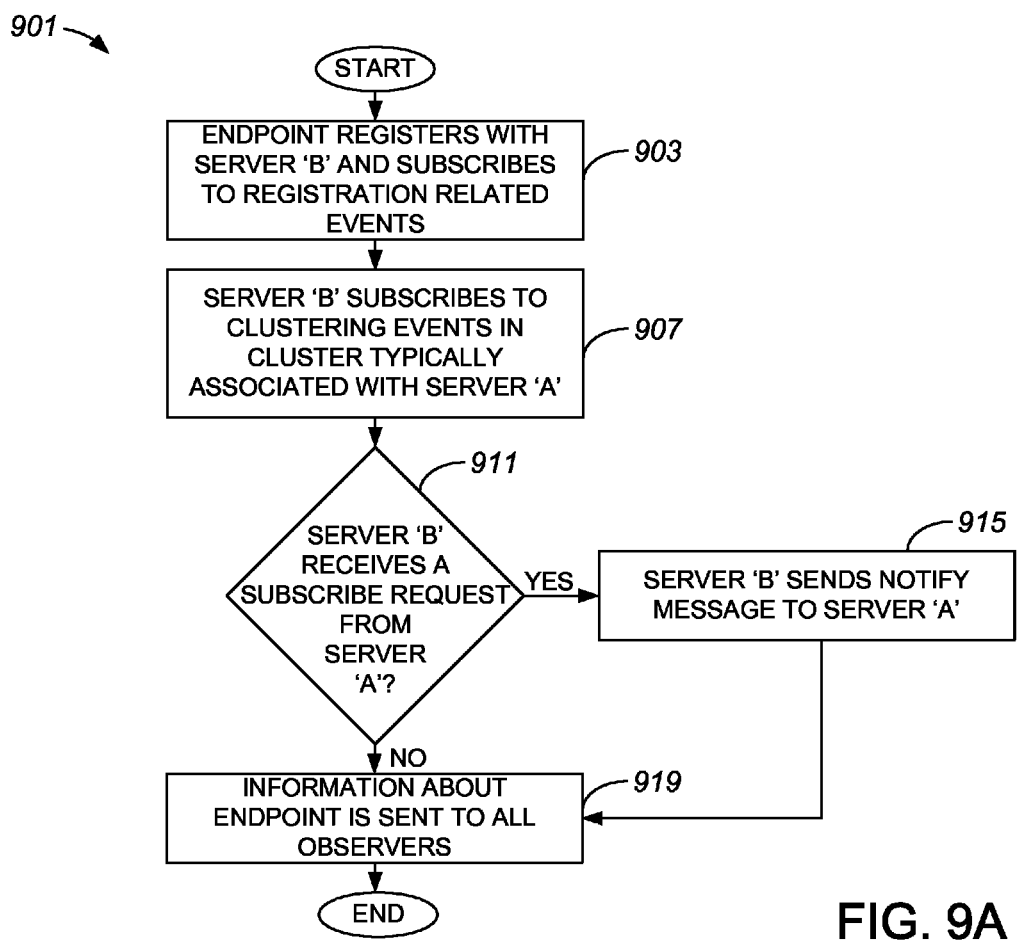
FIG. 9A illustrates an example method for communicating information.

With reference to FIG. 9A, one method of communicating information within a network that includes multiple servers will be described in accordance with an embodiment of the present invention. A process 901 of communicating information begins at step 903 in which an endpoint registers with a server 'B'. The endpoint, which is assigned to server 'A', also subscribes to registration related events associated with server 'B'. Server 'B' may identify the endpoint as being assigned to server 'A' based on Domain Name System (DNS) queries. After the endpoint registers with server 'B', server 'B' subscribes to clustering events in step 907. The clustering events are events associated with a cluster of servers that typically includes server 'A' when server 'A' is available. Clustering events may include, but are not limited to, registration events and re-homing readiness events.

In step 911, it is determined if server 'B' receives a subscribe request from server 'A'. A subscribe request is typically a request to joint a cluster and to receive clustering events associated with the cluster. If it is determined that a subscribe request is received from server 'A', then server 'B' sends a notify message to server 'A' in step 915. The notify message may identify the endpoint that registered with server 'B' in step 903 as being assigned to server 'A'. More generally, the notify message may identify substantially all endpoints that are assigned to server 'A'. After the notify message is sent, information about the endpoint is sent to all observers, e.g., substantially all entities that are subscribed to clustering events, in step 919. Such information may also be sent in a notify message. Once information about the endpoint is sent, the process of communicating information is completed.

Returning to step 911, if the determination is that server 'B' has not received a subscribe request from server 'A', process flow proceeds directly to step 919 in which information about the endpoint is sent to all observers. It should be appreciated that information about newly registered endpoints is generally sent to all observers.

Figure 9B:
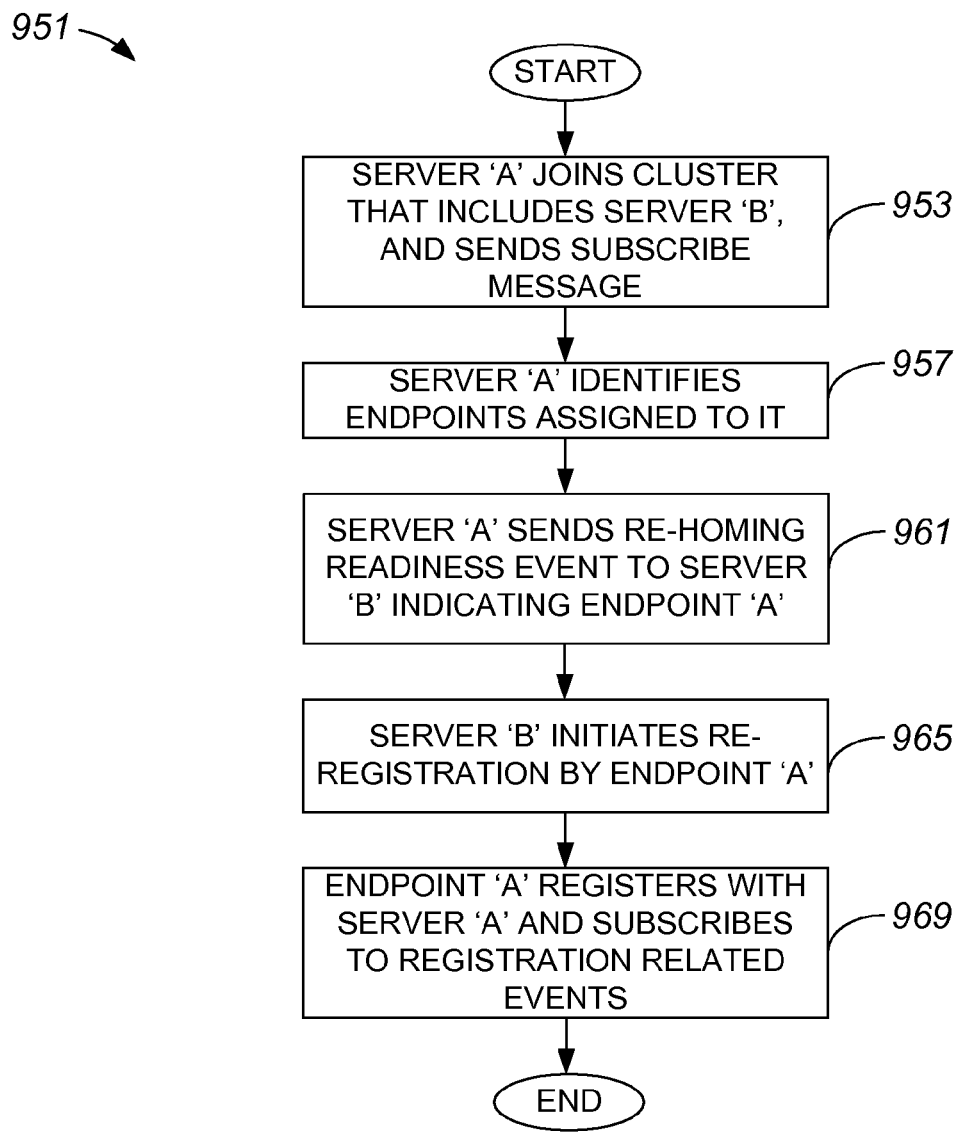
FIG. 9B illustrates an example method for establishing communication between an endpoint and a previously unavailable server.

As previously mentioned, an endpoint generally re-homes to the server to which it is assigned. An overall re-homing process may generally be initiated by either a primary server or an alternate server. FIG. 9B is a process flow diagram which illustrates one method of establishing communication between an endpoint and a previously unavailable server that is initiated by the previously unavailable server in accordance with an embodiment of the present invention. A process 951 of establishing communication between an endpoint and a newly available server begins at step 953 in which server 'A', which is a newly available server, joins a cluster that includes server 'B' and sends a subscribe message to server 'B'. The subscribe message may be a SIP subscribe message, or may be substantially any message that is communicated to server 'B' that allows server 'B' to determine that server 'A' is available. It should be appreciated that sending a subscribe message may effectively include registering with a registrar associated with server 'B'.

In step 957, server 'A' identifies endpoints to which it is the assigned server. server 'A' may identify endpoints to which it is assigned using information contained in notify messages sent by server 'B'. After server 'A' identifies endpoints to which it is assigned, server 'A' sends a re-homing readiness event to server 'B' in step 961. The re-homing readiness event indicates which endpoints server 'A' wishes to be registered with, including endpoint 'A'.

Once server 'B' receives the re-homing readiness event, server 'B' initiates a re-registration by endpoint 'A' in step 965. Then, in step 969, endpoint 'A' registers itself with server 'A', and subscribes to registration related events associated with server 'A'. After endpoint 'A' registers with server 'A', the process of establishing communication is completed.

Figure 9C:
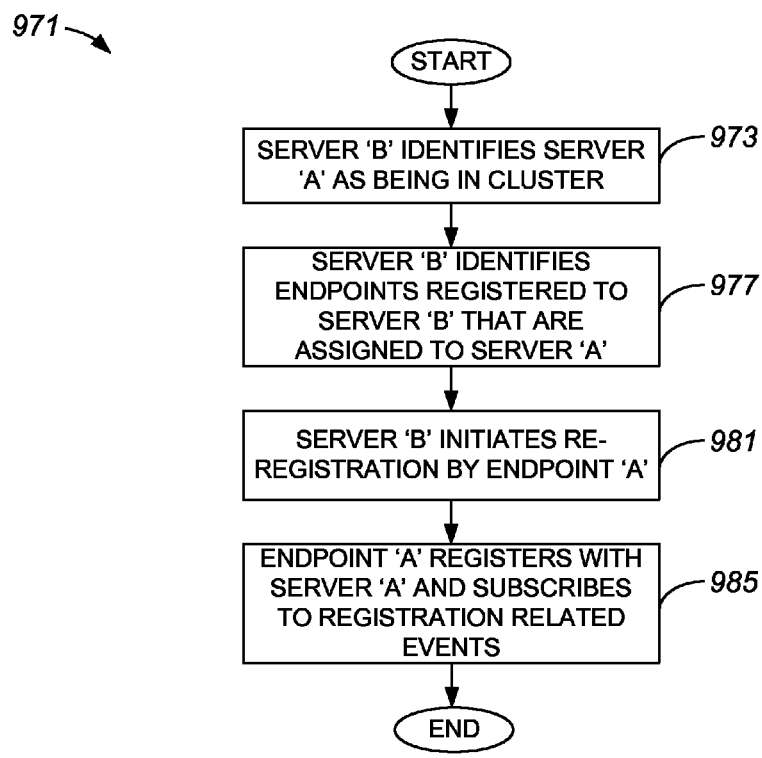
FIG. 9C illustrates another example method for establishing communication between an endpoint and a previously unavailable server.

FIG. 9C is a process flow diagram which illustrates one method of establishing communication between an endpoint and a previously unavailable server that is initiated by an alternate server in accordance with an embodiment of the present invention. A process 971 of establishing communication between an endpoint and a newly available server begins at step 973 in which server 'B' identifies server 'A', which is a newly available server, as being in a cluster that includes server 'B'. Server 'B' may identify server 'A' as being available through communication that may be initiated by either server 'B' or server 'A'.

Once server 'B' identifies server 'A' as being in a cluster, server 'B' identifies endpoints in step 977 that are registered to server 'B' but are assigned to server 'A'. In step 981, server 'B' initiates a re-registration by endpoint 'A'. After re-registration by endpoint 'A' is initiated, endpoint 'A' registers itself with server 'A', and subscribes to registration related events associated with server 'A' in step 985. The process of establishing communication is then completed.

Figure 10:
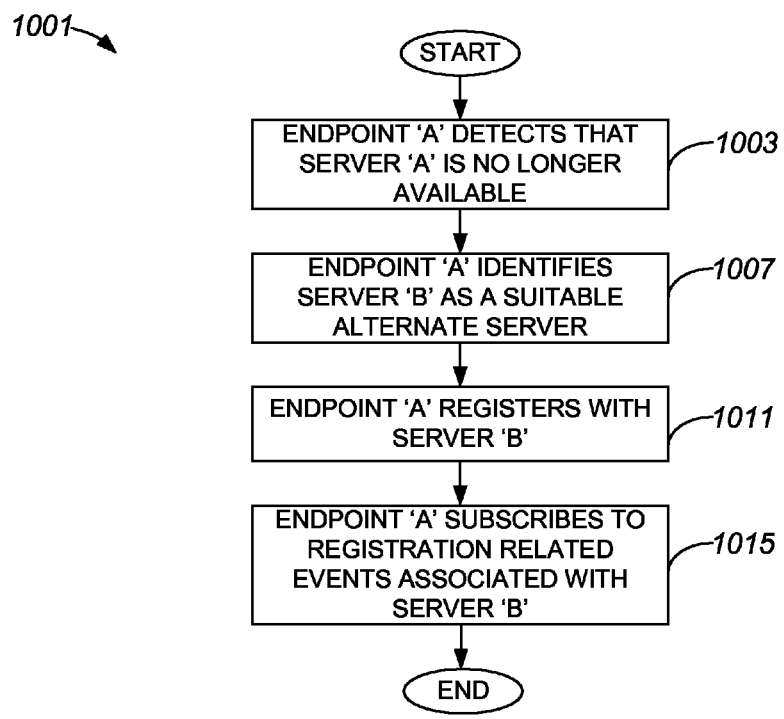
FIG. 10 illustrates an example method for addressing a failure at a primary server.

With reference to FIG. 10, one method of addressing a failure of a primary server, e.g., server 'A' of FIG. 8, in a network that supports a SIP standard will be described in accordance with an embodiment of the present invention. A process 1001 of addressing a failure begins at step 1003 in which endpoint 'A' detects that the server to which it is assigned and registered, e.g., server 'A', is no longer available. Once endpoint 'A' detects that server 'A' is no longer available, endpoint 'A' identifies server 'B' as being an appropriate alternate server in step 1007. Then, in step 1011, endpoint 'A' registers with server 'B'. In one embodiment, endpoint 'A' may register with a registrar associated with server 'B'. After endpoint 'A' registers with server 'B', endpoint 'A' subscribes to registration related events associated with server 'B' in step 1015, and the process of addressing the failure of a primary server is completed.

Although only a few embodiments of the present invention have been described, it should be understood that the present invention may be embodied in many other specific forms without departing from the spirit or the scope of the present invention. By way of example, while H.323 and SIP standards have generally been described as being suitable for use in implementing server driven re-homing, server driven re-homing is not limited to be used in networks which support H.323 and SIP standards. Server driven re-homing may be implemented in substantially any network in which endpoints are assigned to particular registrations servers.

While an alternate gatekeeper in a network that supports an H.323 standard has been described as polling a primary gatekeeper to ascertain when the primary gatekeeper is available, the primary gatekeeper may instead send a notification when the primary gatekeeper becomes available. Such a notification may be sent to endpoints that are assigned to the primary gatekeeper, or to both the endpoints that are assigned to the primary gatekeeper and the alternate gatekeeper to which the endpoints are registered. In other words, a re-homing process may be initiated by a primary gatekeeper. Hence, a re-homing process may either be initiated by a primary gatekeeper when the primary gatekeeper becomes available to endpoints, or by an alternate gatekeeper through a polling process.

A polling mechanism that allows an alternate gatekeeper to poll an assigned or primary gatekeeper is not limited to conveying information regarding whether the primary gatekeeper is alive or available. Other information that may be conveyed may include, but is not limited to, information that indicates a number of registrations the primary gatekeeper is capable of accepting. Using information that indicates a number of registrations the primary gatekeeper may accept, an alternate gatekeeper may direct an appropriate number of endpoints to reregister with the primary gatekeeper. A polling mechanism that conveys information may utilize a GRQ message or substantially any other message that may be sent between gatekeepers.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
    sending an inquiry to a primary registration server to request the status of the primary registration server;
    receiving from the primary registration server an indication of an availability of the primary registration server, the primary registration server being associated with an endpoint associated with an Internet Protocol (IP) protocol, the endpoint being registered with an alternate registration server prior to the indication of the availability of the primary registration server being received, wherein receiving the indication comprises receiving a confirmation message that indicates whether the primary registration server is available, wherein the confirmation message that indicates whether the primary registration server is available further indicates a number of registrations the primary registration server is configured to accept;
    determining whether the primary registration server is available to the endpoint using the indication;
    if the primary registration server is available, notifying the endpoint that the primary registration server is available and that the endpoint is to register with the primary registration server;
    receiving a registration request from the endpoint, wherein the registration request identifies the primary registration server as being assigned to the endpoint; and
    registering the endpoint, wherein registering the endpoint includes identifying the primary registration server as being associated with the endpoint.

2. The method of claim 1 further including receiving a request from the primary registration server to send a notification to the endpoint.

3. The method of claim 2 wherein the notification includes an unregistration request.

4. The method of claim 2 wherein notifying the endpoint that the primary registration server is available and that the endpoint is to register with the primary registration server occurs in response to receiving the request from the primary registration server to send the notification to the endpoint.

5. The method of claim 1 wherein the IP protocol is a H.323 voice over IP (VoIP) protocol, and the primary registration server is a primary gatekeeper.

6. The method of claim 1 wherein the IP protocol is a Session Initiation Protocol (SIP), and the primary registration server is a primary registrar.

7. The method of claim 1 wherein notifying the endpoint that the primary registration server is available and that the endpoint is to register with the primary registration server includes providing a re-homing request to the endpoint to re-home with respect to the primary registration server.

8. The method of claim 1 wherein the indication is received by the alternate registration server, and notifying the endpoint that the primary registration server is available and that the endpoint is to register with the primary registration server includes the alternate registration server notifying the endpoint that the primary registration server is available and that the endpoint is to register with the primary registration server.

9. The method of claim 8 further including: identifying, at the alternate registration server, that the endpoint is assigned to the primary registration server, wherein notifying the endpoint that the primary registration server is available and that the endpoint is to register with the primary registration server includes notifying the endpoint after identifying that the endpoint is assigned to the primary registration server.

10. The method of claim 1 wherein determining whether the primary registration server is available to the endpoint using the indication includes determining, at the alternate registration server, whether the primary registration server is available while the endpoint is registered with the alternate registration server.

11. Logic encoded in one or more non-transitory computer-readable media for execution and when executed operable to:
    receive from a primary registration server an indication of an availability of the primary registration server, the primary registration server being associated with an endpoint associated with an Internet Protocol (IP) protocol, the endpoint being registered with an alternate registration server prior to receiving the indication of the availability of the primary registration server, wherein the logic that is operable to receive from the primary registration server the indication of the availability is further operable to send an inquiry to the primary registration server to request the status of the primary registration server and to receive a confirmation message that indicates the status of the primary registration server, wherein the confirmation message that indicates whether the primary registration server is available further indicates a number of registrations the primary registration server is configured to accept;

determine whether the primary registration server is available to the endpoint using the indication;

if the primary registration server is available, notify the endpoint that the primary registration server is available and that the endpoint is to register with the primary registration server; and receive a registration request from the endpoint, wherein the registration request identifies the primary registration server as being assigned to the endpoint.

12. The logic of claim 11 wherein the logic is further operable to receive a request from the primary registration server to send a notification to the endpoint.

13. The logic of claim 11 wherein the IP protocol is a H.323 voice over IP (VoIP) protocol, and the primary registration server is a primary gatekeeper.

14. The logic of claim 11 wherein the IP protocol is a Session Initiation Protocol (SIP), and the primary registration server is a primary registrar.

15. A method comprising:
identifying a first registration server, wherein an endpoint is assigned to the first registration server but not registered to the first registration server;
identifying an availability of the first registration server;
sending a first message from the first registration server to a second registration server, the endpoint being registered with the second registration server, the first message being arranged to indicate an availability of the first registration server, wherein the second registration server is aware that the endpoint is assigned to the first registration server, the second registration server being arranged to cause the endpoint to unregister from the second registration server if the first message indicates that the first registration server is available, wherein the first message being arranged to indicate the availability of the first registration server further indicates a number of registrations the first registration server is configured to accept; and
receiving a second message from the second registration server, the second message being arranged to request a status of the first registration server, wherein the first registration server and the second registration server are gatekeepers in a network that supports a H.323 standard, the second message being a gatekeeper request message, the first message being a gatekeeper confirm message that is sent in response to the second message, and wherein the first message is a confirmation message and comprises an instruction for the second registration server to initiate a re-homing process for the endpoint that is registered with the second registration server but assigned to the first registration server.

16. The method of claim 15 wherein the first registration server and the second registration server are servers in a network that supports a Session Initiation Protocol (SIP).

17. The method of claim 15 wherein the first registration server identifies the availability and sends the first message to the second registration server.

18. The method of claim 15 wherein the endpoint is registered with the second registration server, and wherein the second registration server is aware that the endpoint is assigned to the first registration server using information provided to the second registration server by the endpoint during a registration process in which the endpoint registered with the second registration server.

19. Logic encoded in one or more non-transitory computer-readable media for execution and when executed operable to:
identify a first registration server, wherein an endpoint is assigned to the first registration server but not registered to the first registration server;
identify an availability of the first registration server; and
send a first message to a second registration server, the endpoint being registered with the second registration server, the first message being arranged to indicate an availability of the first registration server, wherein the second registration server is aware that the endpoint is assigned to the first registration server, the second registration server being arranged to cause the endpoint to unregister from the second registration server if the first message indicates that the first registration server is available, and wherein the first message comprises an instruction for the second registration server to initiate a re-homing process for the endpoint that is registered with the second registration server but assigned to the first registration server, wherein the first message being arranged to indicate the availability of the first registration server further indicates a number of registrations the first registration server is configured to accept.

20. The logic of claim 19 wherein the first message is a confirmation message, the logic further being operable to:
receive a second message from the second registration server, the second message being arranged to request a status of the first registration server.

21. The logic of claim 20 wherein the first registration server and the second registration server are gatekeepers in a network that supports a H.323 standard, the second message being a gatekeeper request message, the first message being a gatekeeper confirm message that is sent in response to the second message.

22. The logic of claim 20 wherein the first registration server and the second registration server are servers in a network that supports a Session Initiation Protocol (SIP).

23. The logic of claim 19 wherein the logic is encoded in one or more tangible media on the first registration server.

24. A method comprising:
sending an inquiry to a primary registration server to request the status of the primary registration server;
receiving from the primary registration server an indication of an availability of the primary registration server, the primary registration server being associated with an endpoint associated with an Internet Protocol (IP) protocol, the endpoint being registered with an alternate registration server prior to the indication of the availability of the primary registration server being received, wherein receiving the indication comprises receiving a confirmation message that indicates whether the primary registration server is available, wherein receiving the indication further includes receiving a re-homing readiness indication that indicates at least one endpoint the primary registration server wishes to be registered with, the at least one endpoint including the endpoint;

determining whether the primary registration server is available to the endpoint using the indication;
if the primary registration server is available, notifying the endpoint that the primary registration server is available and that the endpoint is to register with the primary registration server;
receiving a registration request from the endpoint, wherein the registration request identifies the primary registration server as being assigned to the endpoint; and
registering the endpoint, wherein registering the endpoint includes identifying the primary registration server as being associated with the endpoint.

\* \* \* \* \*